United States Patent
Shimomura et al.

(10) Patent No.: US 7,612,557 B2
(45) Date of Patent: Nov. 3, 2009

(54) EDDY CURRENT TYPE SENSOR FOR DETECTING CONDUCTOR

(75) Inventors: Osamu Shimomura, Okazaki (JP); Tsutomu Nakamura, Kariya (JP); Kenji Takeda, Okazaki (JP); Akitoshi Mizutani, Okazaki (JP); Takao Ban, Toyohashi (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 424 days.

(21) Appl. No.: 11/711,900

(22) Filed: Feb. 28, 2007

(65) Prior Publication Data

US 2007/0200562 A1    Aug. 30, 2007

(30) Foreign Application Priority Data

Feb. 28, 2006  (JP) .............................. 2006-052437

(51) Int. Cl.
*G01B 7/14* (2006.01)

(52) U.S. Cl. .......................... 324/207.26; 324/207.12; 324/207.16

(58) Field of Classification Search ............ 324/207.12, 324/207.15, 207.16, 207.26, 655; 331/65
See application file for complete search history.

(56) References Cited

U.S. PATENT DOCUMENTS

| | | | | |
|---|---|---|---|---|
| 5,072,180 A | * | 12/1991 | Moreau ................. | 324/207.12 |
| 5,079,502 A | * | 1/1992 | Rogacki et al. ........ | 324/207.19 |
| 2002/0149376 A1 | * | 10/2002 | Haffner et al. .............. | 324/635 |
| 2006/0059056 A1 | * | 3/2006 | Tsuchida et al. .............. | 705/27 |
| 2007/0268014 A1 | * | 11/2007 | Shimomura et al. ..... | 324/207.16 |

FOREIGN PATENT DOCUMENTS

| | | |
|---|---|---|
| JP | 2000-097958 | 4/2000 |
| JP | 2000-121655 | 4/2000 |
| JP | 2003-240788 | 8/2003 |

* cited by examiner

*Primary Examiner*—Patrick J Assouad
*Assistant Examiner*—David M. Schindler
(74) *Attorney, Agent, or Firm*—Nixon & Vanderhye, PC

(57) ABSTRACT

An eddy current type sensor for detecting a conductor includes a LC circuit and an oscillator. The LC circuit has a coil and a capacitor connected in parallel with the coil. The oscillator supplies an alternating current of a predetermined oscillation frequency to the LC circuit. A signal voltage outputted from the LC circuit has a first voltage when the distance between the coil and the conductor is minimum and a second voltage when the distance between the coil and the conductor is maximum. A voltage difference between the first and second voltages has a first difference at a first temperature and has a second difference at a second temperature. The first and second differences become equal to each other at a first frequency and a second frequency. The oscillation frequency is set close to the first frequency or the second frequency.

9 Claims, 5 Drawing Sheets

EDDY CURRENT TYPE SENSOR FOR DETECTING CONDUCTOR

CROSS REFERENCE TO RELATED APPLICATION

This application is based on and incorporates herein by reference Japanese Patent Application No. 2006-52437 filed on Feb. 28, 2006.

FIELD OF THE INVENTION

The present invention relates to an eddy current type sensor for detecting a conductor.

BACKGROUND OF THE INVENTION

A conventional turbocharger speed sensor detects a rotational speed of a turbocharger by detecting a rotational speed of a centrifugal compressor in the turbocharger, because the ambient temperature of the centrifugal compressor is relatively low.

A turbocharger speed sensor disclosed in JP-2003-240788 includes a pressure sensor. The pressure sensor detects a periodic change in pressure caused by passage of an aluminum blade of the centrifugal compressor. The turbocharger speed sensor detects the rotational speed of the compressor based on the periodic pressure change.

Another known turbocharger speed sensor detects the rotational speed of the compressor using an eddy current. In the turbocharger speed sensor, an alternating current is supplied to a coil so that the coil generates alternating magnetic field. When the blade of the compressor passes through the magnetic field, the eddy current is induced in the blade. An impedance of the coil changes due to the eddy current. The turbocharger speed sensor detects the rotational speed of the compressor based on the change in the coil impedance. This type of sensor is called as an eddy current type sensor and disclosed in JP-2000-121655.

Since the pressure sensor is generally a semiconductor device, accuracy of the pressure sensor changes with a change in temperature. Further, although the ambient temperature of the centrifugal compressor is relatively low, the ambient temperature may exceed maximum operating temperature of the pressure sensor. Therefore, accuracy of the turbocharger speed sensor disclosed in JP-2003-240788 may decrease under such a high temperature environment.

The eddy current type sensor is suitable for use in the turbocharger speed sensor because the maximum operating temperature of the coil is greater than that of the pressure sensor. However, since the coil impedance changes with the temperature change, accuracy of the eddy current type sensor may decrease under such a high temperature environment. Further, since the coil impedance slightly changes with the change in the eddy current, the change in the coil impedance due to the temperature change greatly affects the accuracy of the eddy current type sensor.

SUMMARY OF THE INVENTION

In view of the above-described problem, it is an object of the present invention to provide an eddy current type sensor for accurately detecting a conductor under a high temperature condition.

An eddy current type sensor for detecting a conductor includes a LC circuit, an oscillator, and a signal processing circuit. The LC circuit has a detection coil for generating alternating magnetic field and a capacitor connected in parallel with the detection coil. The oscillator supplies an alternating current of a predetermined oscillation frequency to the LC circuit. The signal processing circuit determines position of a conductor relative to the detection coil based on a signal voltage outputted from the LC circuit.

The signal voltage has a first voltage value when the detection coil is separated from the conductor by a first distance and has a second voltage value when the detection coil is separated from the conductor by a second distance less than the first distance. A voltage difference between the first and second voltage values has a first difference value at a first temperature and has a second difference value at a second temperature less than the first temperature. The first and second difference values become equal to each other at a first frequency and a second frequency less than the first frequency. The oscillation frequency of the oscillator is set close to the first frequency or the second frequency. In such an approach, change in the voltage difference due to a change in temperature (at least between the first and second temperatures) can be reduced so that the sensor can accurately detect the conductor regardless of the temperature change.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
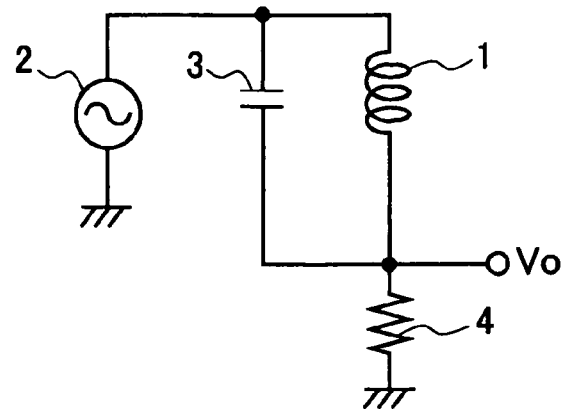
FIG. 1 is a schematic diagram of a main circuit of a turbocharger speed sensor according to a first embodiment of the present invention.
Figure 2:
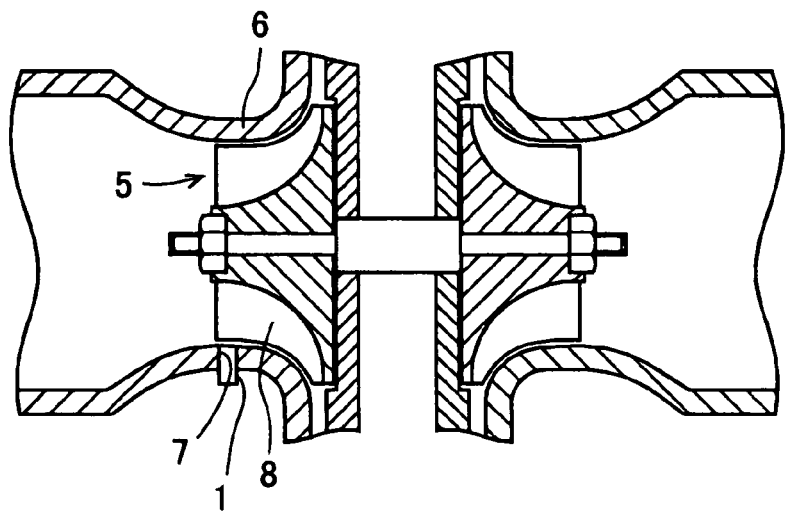
FIG. 2 is a cross-sectional view of a turbocharger having the turbocharger speed sensor according to the first embodiment.

A main circuit of a turbocharger speed sensor according to a first embodiment of the present invention is shown in FIG. 1. The turbocharger speed sensor detects a rotational speed of a turbocharger by detecting a rotational speed of a centrifugal compressor 5 shown in FIG. 2. As shown in FIG. 1, the main circuit includes a detection coil 1, an oscillator 2, a capacitor 3, and a resistor 4. The detection coil 1 and the capacitor 3 are connected in parallel to form a parallel LC circuit having a resonant frequency fr. The oscillator 2 oscillates at an oscillation frequency f0. The resistor 4 is used to detect a signal voltage. The oscillation frequency f0 is set close to the resonant frequency fr.

The compressor 5 is housed in a casing 6 and has a blade 8 made of nonmagnetic aluminum alloy. A coil holder 7 is provided on an inner surface of the casing 6 and arranged outside the blade 8 in the radial direction. The detection coil 1 is received in the coil holder 7.

When the oscillator 2 supplies an alternating current to the detection coil 1, the detection coil 1 produces a first alternating magnetic field toward the inside of the casing 6. The blade 8 of the compressor 5 rotates to cut across the magnetic field so that an eddy current is induced in the blade 8. The eddy current produces a second alternating magnetic field that weakens the first alternating magnetic field. The amount of the eddy current becomes minimum when the distance between the blade 8 and the detection coil 1 is maximum and becomes maximum when the distance between the blade 8 and the detection coil 1 is minimum. The change in the eddy current causes a change in impedance of the detection coil 1.

Figure 3:
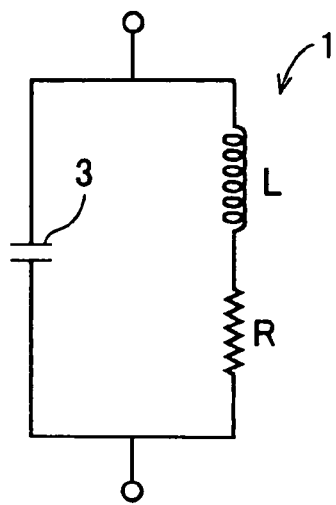
FIG. 3 is an equivalent circuit of a LC circuit of the main circuit of FIG. 1.

An equivalent circuit of the LC circuit is shown in FIG. 3. The detection coil 1 has an inductance L and a resistance R. An impedance ZL of the detection coil 1 is given by:

$$ZL = R + j\omega L$$

The capacitor 3 has a capacitance C. An impedance ZC of the capacitor 3 is given by:

$$ZC = -j\frac{1}{\omega C}$$

A combined impedance Z of the LC circuit is given by:

$$Z = \frac{ZC \times ZL}{ZC + ZL}$$

Figure 4:
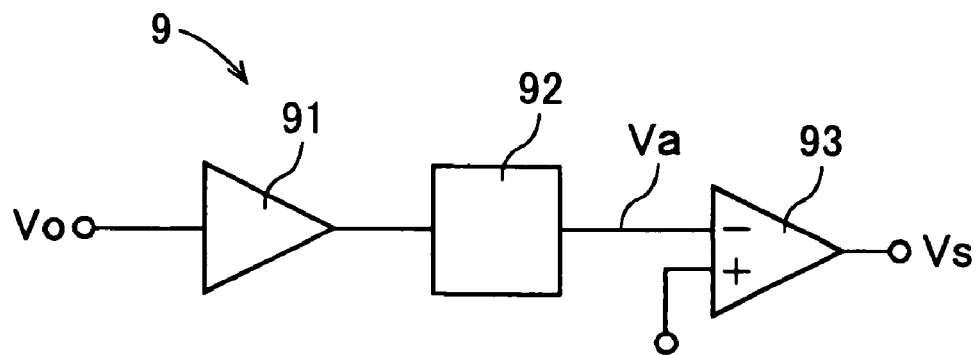
FIG. 4 is a block diagram of a signal processing circuit of the turbocharger speed sensor according to the first embodiment.

A signal processing circuit 9 shown in FIG. 4 detects passage of the blade 8 based on an output voltage Vo of the LC circuit. The processing circuit 9 includes a voltage amplifier 91, an envelope detector 92, and a comparator 93.

Figure 5A:
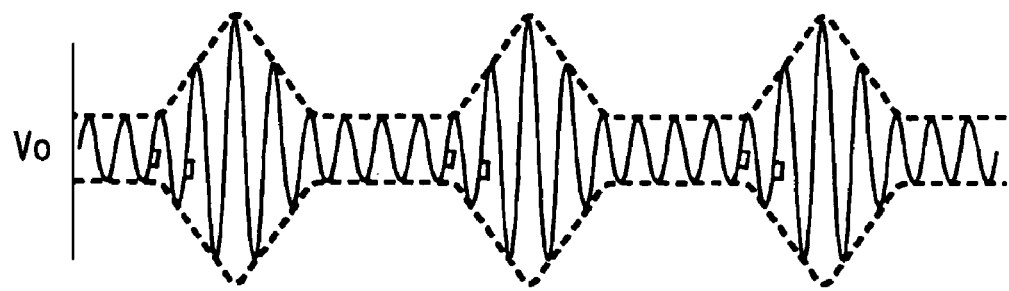
FIG. 5A is a timing diagram of a voltage outputted from the LC circuit.
Figure 5B:
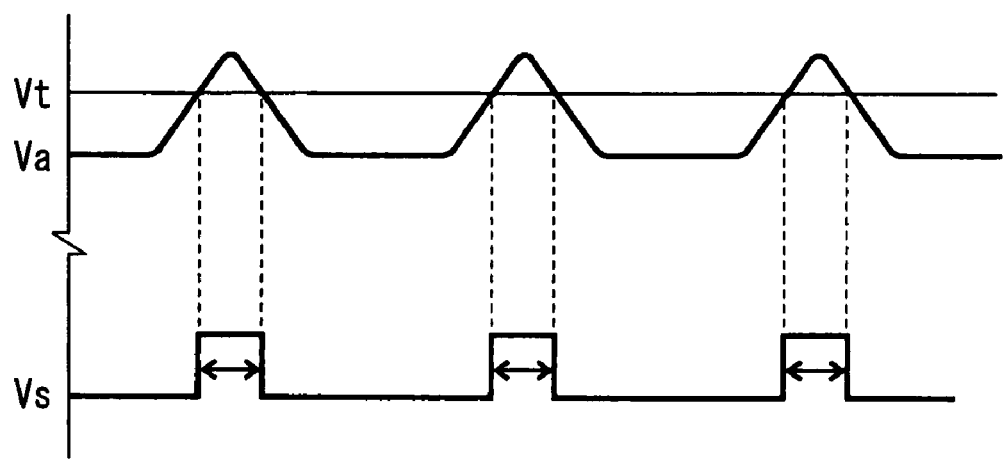
FIG. 5B is a timing diagram of voltages outputted from an envelop detector and a comparator of the signal processing circuit of FIG. 4.

The voltage amplifier 91 amplifies the output voltage Vo shown in FIG. 5A. Then, as shown in FIG. 5B, the envelope detector 92 detects an envelope of the output voltage Vo and outputs an envelope voltage Va to the comparator 93. The comparator 93 converts the envelope voltage Va to a voltage pulse Vs by comparing the envelope voltage Va with a reference voltage Vt. To improve signal to noise ratio (SNR), a narrowband pass filter or resonance filter having a central frequency equal to the oscillation frequency f0 may be interposed between the voltage amplifier 91 and the envelope detector 92.

When the blade 8 is placed in proximity to the detection coil 1, the inductance L of the detection coil 1 decreases due to the effect of the second magnetic field produced by the eddy current. The resonance frequency fr of the LC circuit increases with the decrease in the inductance L. In short, a frequency response of the combined impedance Z of the LC circuit depends on position of the blade 8 relative to the detection coil 1. Therefore, the output voltage Vo of the LC circuit also depends on the position of the blade 8 relative to the detection coil 1. Thus, the turbocharger speed sensor can detect the rotational speed of the compressor 5 based on the output voltage Vo of the LC circuit.

The signal to noise ratio can be improved by setting the oscillation frequency f0 such that a change in the output voltage Vo due to the change in the position of the blade 8 is as large as possible. Specifically, the oscillation frequency f0 is set such that a difference in the output voltage Vo between when the distance between the blade 8 and the detection coil 1 is minimum and when the distance between the blade 8 and the detection coil 1 is maximum is as large as possible. Since the frequency response of the combined impedance Z peaks at the resonant frequency fr, the difference in the output voltage Vo can be increased as much as possible by setting the oscillation frequency f0 close to the resonant frequency fr.

An effect of temperature change on the frequency response of the combined impedance Z is discussed below.

The inductance L of the detection coil 1 and the capacitance C of the capacitor 3 generally increase with the temperature increase. Therefore, the resonant frequency fr of the LC circuit generally decreases with the temperature increase.

The Q factor of the LC circuit is defined as:

$$Q = \frac{wL}{R}$$

In the equivalent circuit shown in FIG. 3, the resistance R of the detection coil 1 increases with the temperature increase. Therefore, the Q factor decreases with the temperature increase. As a result, each of the resonant frequency fr and the Q factor decreases due to the temperature increase. This means that the frequency response of the combined impedance Z of the LC circuit changes with the temperature increase. The change in the frequency response of the combined impedance Z greatly affects the difference in the output voltage Vo. Therefore, it is very important that the oscillation frequency f0 is set so that enough difference in the output voltage Vo can be obtained regardless of the temperature change.

FIGS. 6-9 show results of an experiment conducted to determine the oscillation frequency f0. The experiment is conducted under the condition that the inductance L of the detection coil 1 microhenry (μH), the capacitance C of the capacitor 3 is 220 picofarads (pF), and the resistance R of the detection coil is 3 ohms (Ω) at a normal temperature of 30 degrees Celsius (° C.).

Figure 6:
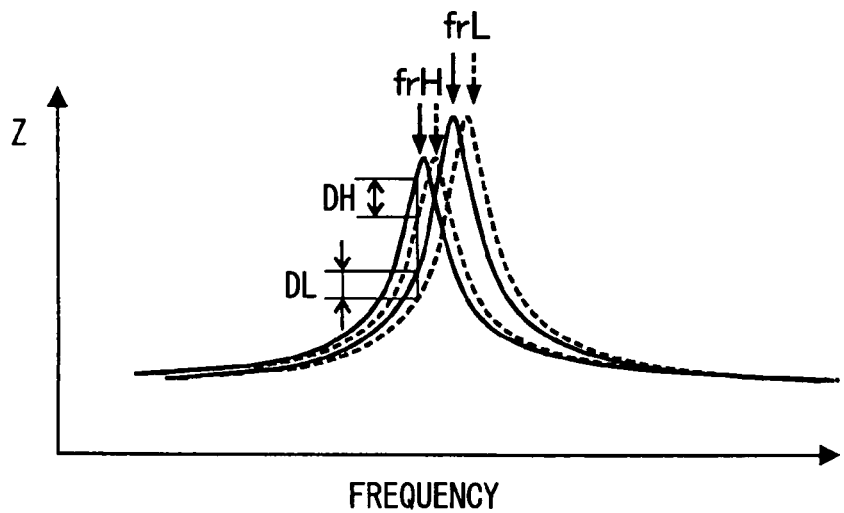
FIG. 6 is a frequency response of an impedance of the LC circuit observed when an inductance of a coil or a capacitance of a capacitor of the LC circuit increases with an increase in temperature.

FIG. 6 shows a general case where the inductance L of the detection coil 1 or the capacitance C of the capacitor 3 increases with the temperature increase so that the resonant frequency fr of the LC circuit decreases with the temperature increase. In FIG. 6, solid lines represent the frequency response of the combined impedance Z observed when the distance between the blade 8 and the detection coil 1 is maximum. Broken lines represent the frequency response of the combined impedance Z observed when the distance between the blade 8 and the detection coil 1 is minimum. In FIG. 6, frL represents the resonant frequency of the LC circuit at a low temperature of −30° C., and frH represents the resonant frequency of the LC circuit at a high temperature of 120° C. As can be seen from FIG. 6, the resonant frequency frH at the high temperature of 120° C. is less than the resonant frequency frL at the low temperature of −30° C. Also, the Q factor is less at the high temperature of 120° C. than at the low temperature of −30° C. A difference DL between the solid line and the broken line represents the difference in the output voltage Vo at the low temperature of −30° C. A difference DH between the solid line and the broken line represents the difference in the output voltage Vo at the high temperature of 120° C.

Figure 7:
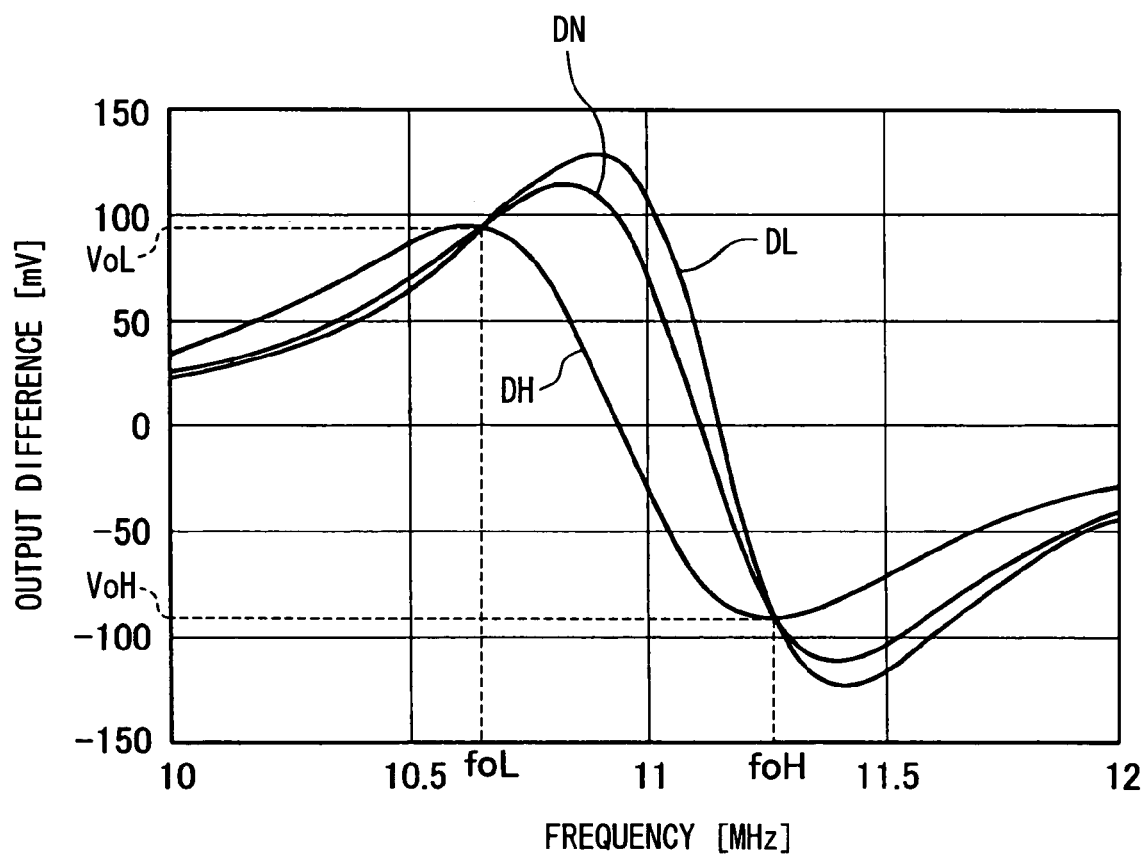
FIG. 7 is a frequency response of a difference in output voltage of the LC circuit having the frequency response of FIG. 6.

FIG. 7 shows frequency responses of the differences DL, DH. In FIG. 7, DN represents the frequency response of the difference in the output voltage Vo at the normal temperature of 30° C.

As shown in FIG. 7, graphs indicating the differences DL, DH intersect at two points. The difference DL becomes equal to the difference DH at frequencies foL, foH. Specifically, each of the differences DL, DH is a voltage VoL at the frequency foL and a voltage VoH at the frequency foH. Therefore, change in the difference in the output voltage Vo due to the temperature change can be reduced by setting the oscillation frequency f0 to the frequency foL or the frequency foH. The voltage VoL is greater than the voltage VoH. Therefore, when the combined impedance Z of the LC circuit has the frequency response shown in FIG. 6, it is preferable that the oscillation frequency f0 is set close to the frequency foL rather than the frequency foH.

Practically, it is difficult to match the frequency foL and the oscillation frequency f0 due to manufacturing variations in the oscillator 2 and the LC circuit. Therefore, the oscillation frequency f0 may be set to a frequency at which each of the differences DL, DH is at most ten percent less or greater than the voltage VoL. In such an approach, even if the manufacturing variations occur, the change in the difference in the output voltage Vo due to the temperature change can be effectively reduced.

Figure 8:
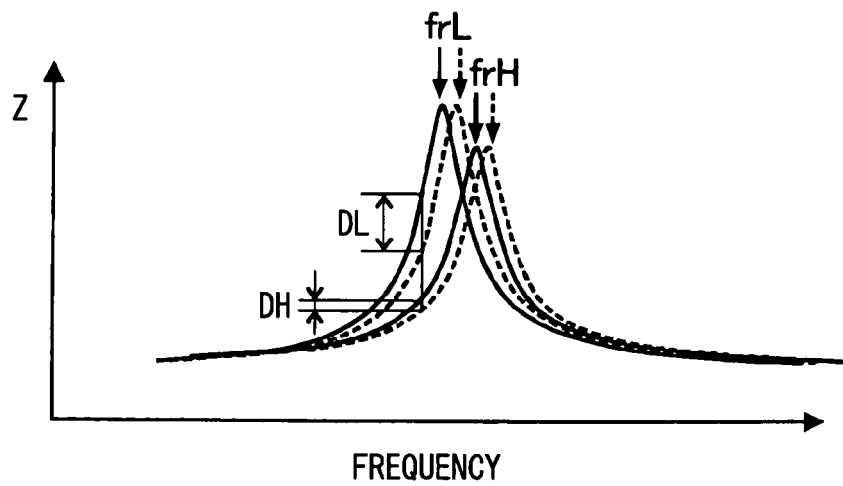
FIG. 8 is a frequency response of an impedance of the LC circuit observed when the inductance of the coil or the capacitance of the capacitor of the LC circuit decreases with the increase in temperature.

FIG. 8 shows a rare case where the inductance L of the detection coil 1 or the capacitance C of the capacitor 3 decreases with the temperature increase so that the resonant frequency fr of the LC circuit increases with the temperature increase. In FIG. 8, solid lines represent the frequency response of the combined impedance Z observed when the distance between the blade 8 and the detection coil 1 is maximum. Broken lines represent the frequency response of the combined impedance Z observed when the distance between the blade 8 and the detection coil 1 is minimum. As can be seen from FIG. 8, a resonant frequency frH at the high temperature of 120° C. is greater than a resonant frequency frL at the low temperature of −30° C. Also, the Q factor is less at the high temperature of 120° C. than at the low temperature of −30° C.

Figure 9:
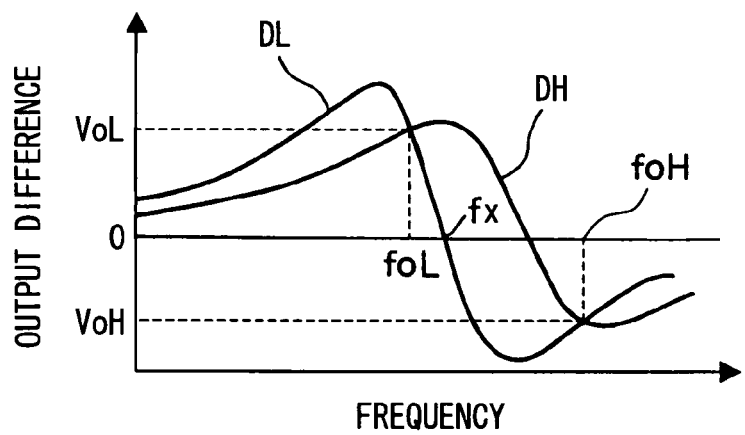
FIG. 9 is a frequency response of the difference in output voltage of the LC circuit having the frequency response of FIG. 8.

FIG. 9 shows frequency responses of differences DL, DH of FIG. 8. As can be seen from FIG. 9, graphs indicating the differences DL, DH intersect at two points. The difference DL becomes equal to the difference DH at frequencies foL, foH. Specifically, each of the differences DL, DH is a voltage VoL at the frequency foL and a voltage VoH at the frequency foH. Therefore, the change in the difference in the output voltage Vo due to the temperature change can be reduced by setting the oscillation frequency f0 to the frequency foL or the frequency foH.

As shown in FIG. 9, the difference DL becomes zero at a frequency fx very close to the frequency foL. This means that when the difference in the output voltage Vo changes due to the change in the oscillation frequency f0, the difference in the output voltage Vo greatly changes at a temperature between the high (i.e., 120° C.) and low (i.e., −30° C.) temperatures, in particular, at the temperature close to the low temperature.

The oscillation frequency f0 of the oscillator 2 deviates from its design value due to the manufacturing variations. Manufacturing cost of the oscillator 2 is increased if the oscillator 2 having the oscillation frequency f0 exactly equal to the design value is manufactured. Further, it is difficult to match the frequency foL and the oscillation frequency f0 due to variations in circuit constant of the LC circuit. Therefore, when the combined impedance Z of the LC circuit has the frequency response shown in FIG. 8, it is preferable that the oscillation frequency f0 is set close to the frequency foH rather than the frequency foL. Thus, large difference in the output voltage Vo can be ensured regardless of the temperature change and the circuit constant variations.

Practically, it is difficult to match the frequency foH and the oscillation frequency f0 due to manufacturing variations in the oscillator 2 and the LC circuit. Therefore, the oscillation frequency f0 may be set to a frequency at which each of the differences DL, DH is at most ten percent less or greater than the voltage VoH. In such an approach, even if the manufacturing variations occur, the change in the difference in the output voltage Vo due to the temperature change can be effectively reduced.

Figure 10:
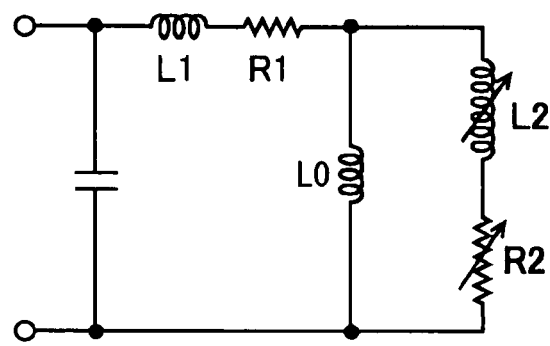
FIG. 10 is an equivalent circuit of the LC circuit including an eddy current circuit.

When the eddy current is taken into consideration, an equivalent circuit of the LC circuit including an eddy current circuit is given as shown in FIG. 10. The detection coil 1 has an exciting inductance L0, a leakage inductance L1, and a resistance R1. The eddy current circuit has a leakage inductance L2 and a resistance R2. The leakage inductance L1 is an inductance that is not coupled to the eddy current circuit. The leakage inductance L2 is an inductance that is not coupled to the detection coil 1.

Z1, Z2, Z0, are defined as follows:

$Z1 = R1 + j\omega L1$ $Z2 = R2 + j\omega L2$ $Z0 = j\omega L0$

An impedance ZL of the detection coil 1 is given as follows:

$$ZL = Z1 + \frac{(Z2 + \Delta Z2)Z0}{Z0 + (Z2 + \Delta Z2)}$$
$$= \frac{Z2Z0 + Z1Z0 + Z1Z2 + \Delta Z2(Z0 + Z1)}{Z0 + Z2 + \Delta Z2}$$

ΔZ2 represents the amount of change in the impedance Z2. Specifically, ΔZ2 is a difference in the impedance Z2 between when the distance between the detection coil 1 and the blade 8 is minimum and when the distance between the detection coil 1 and the blade 8 is maximum.

K is defined as follows:

$K = Z2Z0 + Z1Z0 + Z1Z2$

The impedance ZL of the detection coil 1 is given as follows with K:

$$ZL = \frac{K + \Delta Z2(Z0 + Z1)}{Z0 + Z2 + \Delta Z2}$$

Since the $\Delta Z2$ of the denominator of the above equation is very small, the $\Delta Z2$ of the denominator is omitted as follows:

$$ZL = \frac{K + \Delta Z2(Z0 + Z1)}{Z0 + Z2}$$

S is defined as follows:

$$S = \frac{K}{Z0 + Z2}$$

The impedance ZL of the detection coil 1 is given as follows with S:

$$ZL = S + \frac{\Delta Z2(Z0 + Z1)}{Z0 + Z2} = S + \frac{\Delta Z2(1 + Z1/Z0)}{1 + Z2/Z0}$$

T is defined as follows:

$$T = \frac{1 + Z1/Z0}{1 + Z2/Z0}$$

The impedance ZL of the detection coil 1 is given as follows with T:

$$ZL = S + T\Delta Z2$$

S is assumed as follows:

$$S = Rs + j\omega Ls$$

The impedance ZL of the detection coil 1 is given as follows without S:

$$ZL = Rs + T\Delta R2 + j\omega(Ls + T\Delta L2)$$

Rx and Lx are defined as follows:

$$Rx = Rs + T\Delta R2$$

$$Lx = Ls + T\Delta L2$$

The impedance ZL of the detection coil 1 is given as follows with Rx, Lx:

$$ZL = Rx + j\omega Lx$$

Therefore, an equivalent inductance Lx of the detection coil 1 has an inductance component $\Delta L2$, which changes with the temperature change.

As can be understood from the above equations, the impedance ZL of the detection coil 1 increases with an increase in the $\Delta Z2$ and decreases with a decrease in the $\Delta Z2$.

Specifically, when the blade 8 is placed in proximity to the detection coil 1, the eddy current increases. Therefore, it can be considered that the resistance R2 of the impedance Z2 decreases. As a result, the inductance of the detection coil 1 decreases, because the second magnetic field produced by the eddy current increases. Thus, when the blade 8 is placed in proximity to the detection coil 1, the impedance ZL of the detection coil 1 decreases. This means that when the blade 8 is placed in proximity to the detection coil 1, the resonate frequency fr of the LC circuit slightly increases.

As the temperature increases, the resistance R2 increases. As a result, the second magnetic field produced by the eddy current decreases, because the eddy current decreases due to the increase in the resistance R2. Therefore, magnetic flux generated by unit current flowing through the detection coil 1 increases so that the inductance of the detection coil 1 increases. This means that when the inductance component of the impedance ZL increases due to the temperature increase, the resonate frequency fr of the LC circuit decreases.

Second Embodiment

Figure 11:
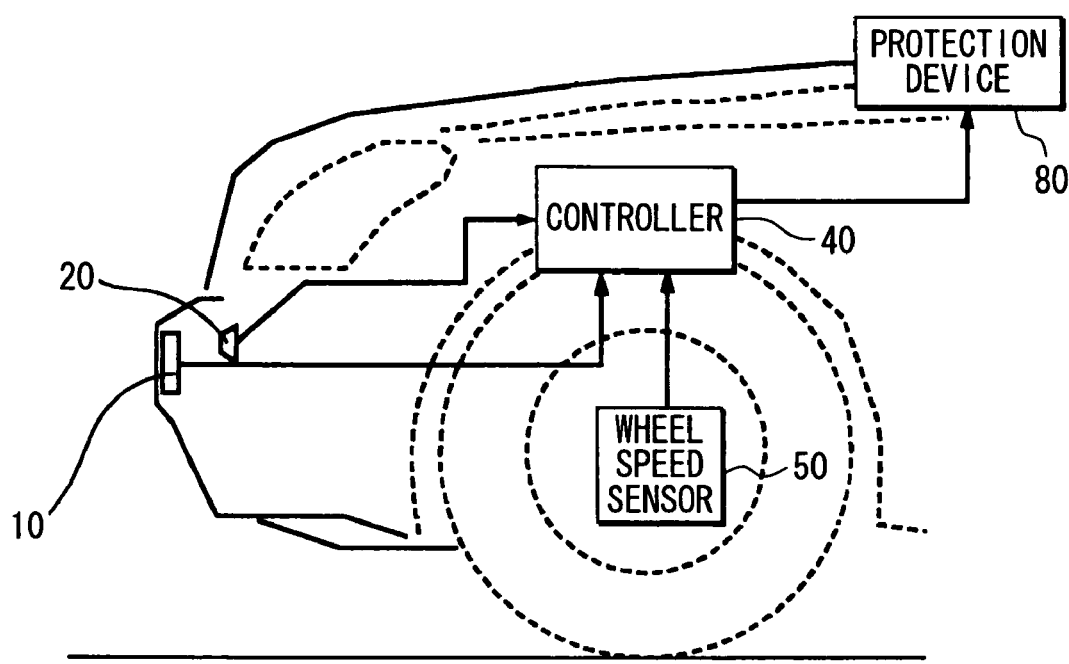
FIG. 11 is a block diagram of a pedestrian detection system according to a second embodiment of the present invention.

A pedestrian detection system according to a second embodiment of the present invention is shown in FIG. 11. The pedestrian detection system includes an eddy current proximity sensor 10, a collision sensor 20, a controller 40 having a microcomputer (not shown) and an A/D converter (not shown), a wheel speed sensor 50, and a pedestrian protection device 80 such as an airbag or a seat belt pretensioner. The eddy current proximity sensor 10 includes the main circuit shown in FIG. 1. When the detection coil 1 is placed in proximity to a conductor such as a metal pole, an eddy current is induced in the conductor. The inductance L of the detection coil 1 decreases due to the effect of the eddy current. As a result, the combined impedance Z of the LC circuit decreases. In contrast, when the detection coil 1 is placed in proximity to human body or an insulator, the combined impedance Z of the LC circuit decreases very little. Thus, the eddy current proximity sensor 10 can distinguish between the conductor and the pedestrian.

When a collision occurs, the collision sensor 20 outputs a voltage signal corresponding to, preferably, proportional to impact caused by the collision. Outputs of the eddy current proximity sensor 10, the collision sensor 20, and the wheel speed sensor 50 are transmitted to the controller 40. In the controller 40, the A/D converter converts the outputs into digital signal and the microcomputer determines, based on the digital signal, whether a collision with a pedestrian occurs. If the microcomputer determines that the collision with the pedestrian occurs, the microcomputer drives the pedestrian protection device 80.

According to the second embodiment, the pedestrian detection system uses the eddy current proximity sensor 10 having the main circuit shown in FIG. 1. The change in the difference in the output voltage Vo due to the temperature change can be reduced by setting the oscillation frequency f0 close to the frequency foL or the frequency foH. In such an approach, the eddy current proximity sensor 10 can accurately distinguish between the conductor and the pedestrian so that the pedestrian detection system can properly drive the pedestrian protection device 80.

MODIFICATIONS

The embodiment described above may be modified in various ways. For example, the capacitor 3 may be separated far from the detection coil 1 so that the capacitor 3 can be separated far from the turbocharger. In such an approach, the capacitor 3 is prevented from being exposed to the high temperature so that the change in the output voltage Vo can be reduced. Alternatively, a cooling member such as a fan may cool the capacitor 3. Alternatively, the capacitor 3 may be more thermally insulated from the turbocharger than the detection coil 1. In this case, a cable for connecting the detection coil 1 and the capacitor 3 may easily pick up noise, because the length of the cable needs to be increased. To prevent the noise, an electromagnetic shielded cable or a twisted cable may be used to connect the detection coil 1 and the capacitor 3.

Such changes and modifications are to be understood as being within the scope of the present invention as defined by the appended claims.

What is claimed is:

1. An eddy current type sensor for detecting a conductor comprising:
    a LC circuit including a detection coil for generating alternating magnetic field and a capacitor connected in parallel with the detection coil;
    an oscillator for supplying an alternating current of a predetermined oscillation frequency to the LC circuit; and
    a signal processing circuit for determining position of the conductor relative to the detection coil based on a signal voltage outputted from the LC circuit, wherein
    the signal voltage has a first voltage value when the detection coil is separated from the conductor by a first distance and has a second voltage value when the detection coil is separated from the conductor by a second distance less than the first distance,
    a voltage difference between the first and second voltage values has a first difference value at a first temperature and has a second difference value at a second temperature less than the first temperature,
    the first and second difference values become equal to each other at a first frequency and a second frequency less than the first frequency, and
    the oscillation frequency is set close to the first frequency or the second frequency.

2. The sensor according to claim 1, wherein
    the LC circuit has a first resonant frequency at the first temperature, a second resonant frequency at the second temperature, a first impedance at the first resonant frequency, and a second impedance at the second resonant frequency,
    the first resonant frequency is less than the second resonant frequency,
    the first impedance is less than the second impedance, and
    the oscillation frequency is set close to the second frequency.

3. The sensor according to claim 2, wherein
    the oscillation frequency is set to a third frequency that is close to the second frequency,
    the voltage difference between the first and second voltage values has a third difference value at the third frequency, the third difference value has a fourth difference value at the first temperature and a fifth difference value at the second temperature,
    the fourth difference value is at most ten percent less than or at most ten percent greater than the voltage difference at the second frequency, and
    the fifth difference value is at most ten percent less than or at most ten percent greater than the voltage difference at the second frequency.

4. The sensor according to claim 2, wherein
    a capacitance of the capacitor or an inductance of the detection coil increases with an increase in temperature.

5. The sensor according to claim 1, wherein
    the LC circuit has a first resonant frequency at the first temperature, a second resonant frequency at the second temperature, a first impedance at the first resonant frequency, and a second impedance at the second resonant frequency,
    the first resonant frequency is greater than the second resonant frequency,
    the first impedance is less than the second impedance, and
    the oscillation frequency is set close to the first frequency.

6. The sensor according to claim 5, wherein
    the oscillation frequency is set to a fourth frequency that is close to the first frequency,
    the voltage difference between the first and second voltage values has a sixth difference value at the fourth frequency,
    the sixth difference value has a seventh difference value at the first temperature and an eighth difference value at the second temperature,
    the seventh difference value is at most ten percent less than or at most ten percent greater than the voltage difference at the first frequency, and
    the eighth difference value is at most ten percent less than or at most ten percent greater than the voltage difference at the first frequency.

7. The sensor according to claim 5, wherein
    a capacitance of the capacitor or an inductance of the detection coil decreases with an increase in temperature.

8. The sensor according to claim 1, wherein
    the conductor is a blade of a centrifugal compressor in a turbocharger.

9. The sensor according to claim 8, wherein
    the capacitor is separated from the detection coil so that the capacitor is more thermally insulated from the compressor than the detection coil.

* * * * *